(12) United States Patent
Subramanian et al.

(10) Patent No.: US 10,243,772 B2
(45) Date of Patent: Mar. 26, 2019

(54) REFERENCE SIGNAL RESOURCE LOCATION TECHNIQUES IN WIRELESS COMMUNICATIONS

(71) Applicant: QUALCOMM Incorporated, San Diego, CA (US)

(72) Inventors: Sundar Subramanian, San Diego, CA (US); Alexei Yurievitch Gorokhov, San Diego, CA (US); Junyi Li, Chester, NJ (US); Juergen Cezanne, Ocean Township, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/943,518

(22) Filed: Apr. 2, 2018

(65) Prior Publication Data
US 2018/0287841 A1 Oct. 4, 2018

Related U.S. Application Data

(60) Provisional application No. 62/481,669, filed on Apr. 4, 2017.

(51) Int. Cl.
*H04L 5/00* (2006.01)
*H04L 27/26* (2006.01)
(Continued)

(52) U.S. Cl.
CPC ........ *H04L 27/2611* (2013.01); *H04L 5/0048* (2013.01); *H04W 72/046* (2013.01);
(Continued)

(58) Field of Classification Search
USPC .......... 375/267, 299; 455/101; 370/329, 334
See application file for complete search history.

(56) References Cited

U.S. PATENT DOCUMENTS 8,923,250 B2  12/2014  Noh et al.
2013/0064216 A1  3/2013  Gao et al.
(Continued)

OTHER PUBLICATIONS

CMCC: "Discussion on DCI Contents for NR", 3GPP Draft; R1-1705104, 3rd Generation Partnership Project (3GPP), Mobile Competence Centre; 650, Route Des Lucioles; F-06921 Sophia-Antipolis Cedex; France, vol. RAN WG1, no. Spokane; Apr. 3, 2017-Apr. 7, 2017, Apr. 2, 2017 (Apr. 2, 2017), 7 Pages, XP051243235, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Kevin Kim
(74) *Attorney, Agent, or Firm* — Holland & Hart, LLP/Qualcomm Incorporated

(57) ABSTRACT

Methods, systems, and devices for wireless communication are described in which a number of reference signal processes may be configured for a number of slots in a radio frame, and a corresponding reference signal process for each slot may be based at least in part on a location of the slot within the radio frame and a number of configured reference signal processes. An indication may be provided to a user equipment (UE) in each slot that indicates a presence or absence of a reference signal transmission in the slot.

42 Claims, 15 Drawing Sheets

(51) Int. Cl.
*H04W 72/04* (2009.01)
*H04W 24/10* (2009.01)

(52) U.S. Cl.
CPC ........ *H04W 24/10* (2013.01); *H04W 72/0406* (2013.01); *H04W 72/0446* (2013.01)

(56) References Cited

U.S. PATENT DOCUMENTS

| | | | |
|---|---|---|---|
| 2016/0043843 A1* | 2/2016 | Liu | H04L 5/0048 370/329 |
| 2016/0227548 A1 | 8/2016 | Nimbalker et al. | |
| 2017/0141894 A1 | 5/2017 | Wei et al. | |
| 2017/0195031 A1* | 7/2017 | Onggosanusi | H04B 7/0626 |
| 2017/0201968 A1 | 7/2017 | Nam et al. | |
| 2017/0295000 A1 | 10/2017 | Yoo et al. | |
| 2018/0212800 A1* | 7/2018 | Park | H04L 1/00 |
| 2018/0248720 A1* | 8/2018 | Park | H04B 7/0473 |

OTHER PUBLICATIONS

Ericsson: "Aperiodic CSI and CSI-RS Resource Pooling", 3GPP Draft; R1-1609763 Aperiodic CSI and CSI-RS Resource Pooling, 3rd Generation Partnership Project (3GPP), Mobile Competence Centre; 650, Route Des Lucioles; F-06921 Sophia-Antipolis Cedex; France, vol. RAN WGI, no. Lisbon, Portugal; Oct. 10, 2016-Oct. 14, 2016, Oct. 9, 2016 (Oct. 9, 2016), 4 Pages, XP051149793, Retrieved from the Internet: URL: http://www.3gpp.org/ftp/Meetings_3GPP_SYNC/RAN1/Docs/ [retrieved on Oct. 9, 2016] the whole document.
International Search Report and Written Opinion—PCT/US2018/025924—ISA/EPO—Jun. 20, 2018.
Qualcomm Incorporated: "Discussion on CSI-RS Design", 3GPP Draft; R1-1705589, 3rd Generation Partnership Project (3GPP), Mobile Competence Centre; 650, Route Des Lucioles; F-06921 Sophia-Antipolis Cedex; France, vol. RAN WG1, no. Spokane, USA; Apr. 3, 2017-Apr. 7, 2017, Apr. 2, 2017 (Apr. 2, 2017), 5 Pages, XP051243715, Retrieved from the Internet: URL: http://www.3gpp.org/ftp/Meetings_3GPP_SYNC/RAN1/Docs/ [retrieved on Apr. 2, 2017].

* cited by examiner

REFERENCE SIGNAL RESOURCE LOCATION TECHNIQUES IN WIRELESS COMMUNICATIONS

CROSS REFERENCES

The present application for patent claims priority to U.S. Provisional Patent Application No. 62/481,669 by Subramanian, et al., entitled "Reference Signal Resource Location Techniques In Wireless Communications," filed Apr. 4, 2017, assigned to the assignee hereof.

BACKGROUND

The following relates generally to wireless communication, and more specifically to reference signal resource location techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless systems, devices (e.g., base stations and UEs) may communicate using directional transmissions (e.g., beams), in which beamforming may be applied using multiple antenna elements to provide a beam in a particular direction. In some cases, a base station may be unaware of a particular location of a UE, such as when a gap in communications occurs while a UE is moving. When a first device does not know the direction in which to transmit to a second device, the first device may transmit to the second device by sweeping through a set of beams focused in different directions, and transmitting a duplicative signal or information on each of the beams. Alternatively, the first device may transmit on one or a few beams, and the second device may sweep through a set of beams in an attempt to locate the beam or beams on which the first device is transmitting. In some cases, both the first device and the second device may sweep through a set of beams to transmit and receive.

SUMMARY

The described techniques relate to improved methods, systems, devices, or apparatuses that support reference signal resource location techniques in wireless communications. In a wireless communications system, such as a millimeter wave (mmW) system, a base station and a user equipment (UE) may utilize directional transmissions for reference signal processes that may be used to find and maintain suitable beams to enable a communication link between the UE and the base station. In some examples, the UE may configure a number of reference signal processes for a number of slots in a radio frame and may, for each slot, identify a corresponding reference signal process of the configured reference signal processes. In some cases, the corresponding reference signal process for each slot may be based at least in part on a location of the slot within the radio frame, a number of configured reference signal processes, or combinations thereof.

The UE may configure RF receive components for a slot based on the identified reference signal process for the slot, and may monitor for control information that indicates whether a reference signal is transmitted in the slot. If the control information indicates that a reference signal is present in the slot, the UE may receive the reference signal based on the configured RF receive components. In some examples, the control information may be an indication that is transmitted in downlink control information (DCI) associated with each slot that indicates a presence or absence of a reference signal transmission in the slot, thus allowing a base station to transmit non-periodic reference signals (e.g., a semi-persistent or aperiodic CSI-RS) that may be received at the UE.

A method of wireless communication is described. The method may include identifying, for at least one of a plurality of slots, a corresponding reference signal process of a plurality of configured reference signal processes based at least in part on a location of the slot, wherein the corresponding reference signal process indicates one or more beamforming parameters for a receive beam, receiving a control signal that indicates a presence of a non-periodic reference signal in at least one of the plurality of slots, and receiving the reference signal in the at least one of the plurality of slots based at least in part on the control signal and the beamforming parameters.

An apparatus for wireless communication is described. The apparatus may include means for identifying, for at least one of a plurality of slots, a corresponding reference signal process of a plurality of configured reference signal processes based at least in part on a location of the slot, wherein the corresponding reference signal process indicates one or more beamforming parameters for a receive beam, means for receiving a control signal that indicates a presence of a non-periodic reference signal in at least one of the plurality of slots, and means for receiving the reference signal in the at least one of the plurality of slots based at least in part on the control signal and the beamforming parameters.

Another apparatus for wireless communication is described. The apparatus may include a processor, memory in electronic communication with the processor, and instructions stored in the memory. The instructions may be operable to cause the processor to identify, for at least one of a plurality of slots, a corresponding reference signal process of a plurality of configured reference signal processes based at least in part on a location of the slot, wherein the corresponding reference signal process indicates one or more beamforming parameters for a receive beam, receive a control signal that indicates a presence of a non-periodic reference signal in at least one of the plurality of slots, and receive the reference signal in the at least one of the plurality of slots based at least in part on the control signal and the beamforming parameters.

A non-transitory computer readable medium for wireless communication is described. The non-transitory computer-readable medium may include instructions operable to cause a processor to identify, for at least one of a plurality of slots, a corresponding reference signal process of a plurality of configured reference signal processes based at least in part on a location of the slot, wherein the corresponding reference signal process indicates one or more beamforming parameters for a receive beam, receive a control signal that indicates a presence of a non-periodic reference signal in at least one of the plurality of slots, and receive the reference signal in the at least one of the plurality of slots based at least in part on the control signal and the beamforming parameters.

Some examples of the method, apparatus, and non-transitory computer-readable medium described above may further include processes, features, means, or instructions for transmitting, responsive to receiving the non-periodic reference signal, a measurement report to a base station via a transmit beam of a beam pair link that includes the receive beam. In some examples of the method, apparatus, and non-transitory computer-readable medium described above, each of the plurality of configured reference signal processes includes one or more of time resources or frequency resources configured for an associated reference signal transmission. In some examples of the method, apparatus, and non-transitory computer-readable medium described above, the corresponding reference signal process of the plurality of configured reference signal processes is identified based at least in part on a slot index of the at least one of the plurality of slots. In some examples of the method, apparatus, and non-transitory computer-readable medium described above, the corresponding reference signal process of the plurality of configured reference signal processes may be identified based at least in part on a slot index modulo the number of the plurality of configured reference signal processes. In some examples of the method, apparatus, and non-transitory computer-readable medium described above, the control signal comprises an indication in downlink control information (DCI) within the at least one of the plurality of slots.

Some examples of the method, apparatus, and non-transitory computer-readable medium described above may further include processes, features, means, or instructions for receiving radio resource control (RRC) signaling with configuration information for the plurality of configured reference signal processes.

A method of wireless communication is described. The method may include configuring a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot, transmitting a control signal to indicate a presence of a non-periodic reference signal in a first slot of the plurality of slots, and transmitting the non-periodic reference signal in the first slot via a transmit beam of a plurality of transmit beams.

An apparatus for wireless communication is described. The apparatus may include means for configuring a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot, means for transmitting a control signal to indicate a presence of a non-periodic reference signal in a first slot of the plurality of slots, and means for transmitting the non-periodic reference signal in the first slot via a transmit beam of a plurality of transmit beams.

Another apparatus for wireless communication is described. The apparatus may include a processor, memory in electronic communication with the processor, and instructions stored in the memory. The instructions may be operable to cause the processor to configure a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot, transmit a control signal to indicate a presence of a non-periodic reference signal in a first slot of the plurality of slots, and transmit the non-periodic reference signal in the first slot via a transmit beam of a plurality of transmit beams.

A non-transitory computer readable medium for wireless communication is described. The non-transitory computer-readable medium may include instructions operable to cause a processor to configure a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot, transmit a control signal to indicate a presence of a non-periodic reference signal in a first slot of the plurality of slots, and transmit the non-periodic reference signal in the first slot via a transmit beam of a plurality of transmit beams.

Some examples of the method, apparatus, and non-transitory computer-readable medium described above may further include processes, features, means, or instructions for receiving, responsive to the transmitting the non-periodic reference signal, a measurement report from the UE via a receive beam of a beam pair link that includes the transmit beam. In some examples of the method, apparatus, and non-transitory computer-readable medium described above, each of the plurality of reference signal processes includes one or more of time resources or frequency resources configured for an associated reference signal transmission. In some examples of the method, apparatus, and non-transitory computer-readable medium described above, the corresponding reference signal process of the plurality of configured reference signal processes may be identified as a slot index modulo the number of the plurality of configured reference signal processes. In some examples of the method, apparatus, and non-transitory computer-readable medium described above, the transmitting the control signal comprises setting an indicator in downlink control information (DCI) of the first slot to indicate the presence of absence of the reference signal in the first slot.

In some examples of the method, apparatus, and non-transitory computer-readable medium described above, the configuring comprises transmitting radio resource control (RRC) signaling with configuration information for the plurality of reference signal processes to the UE.

DETAILED DESCRIPTION

Figure 1:
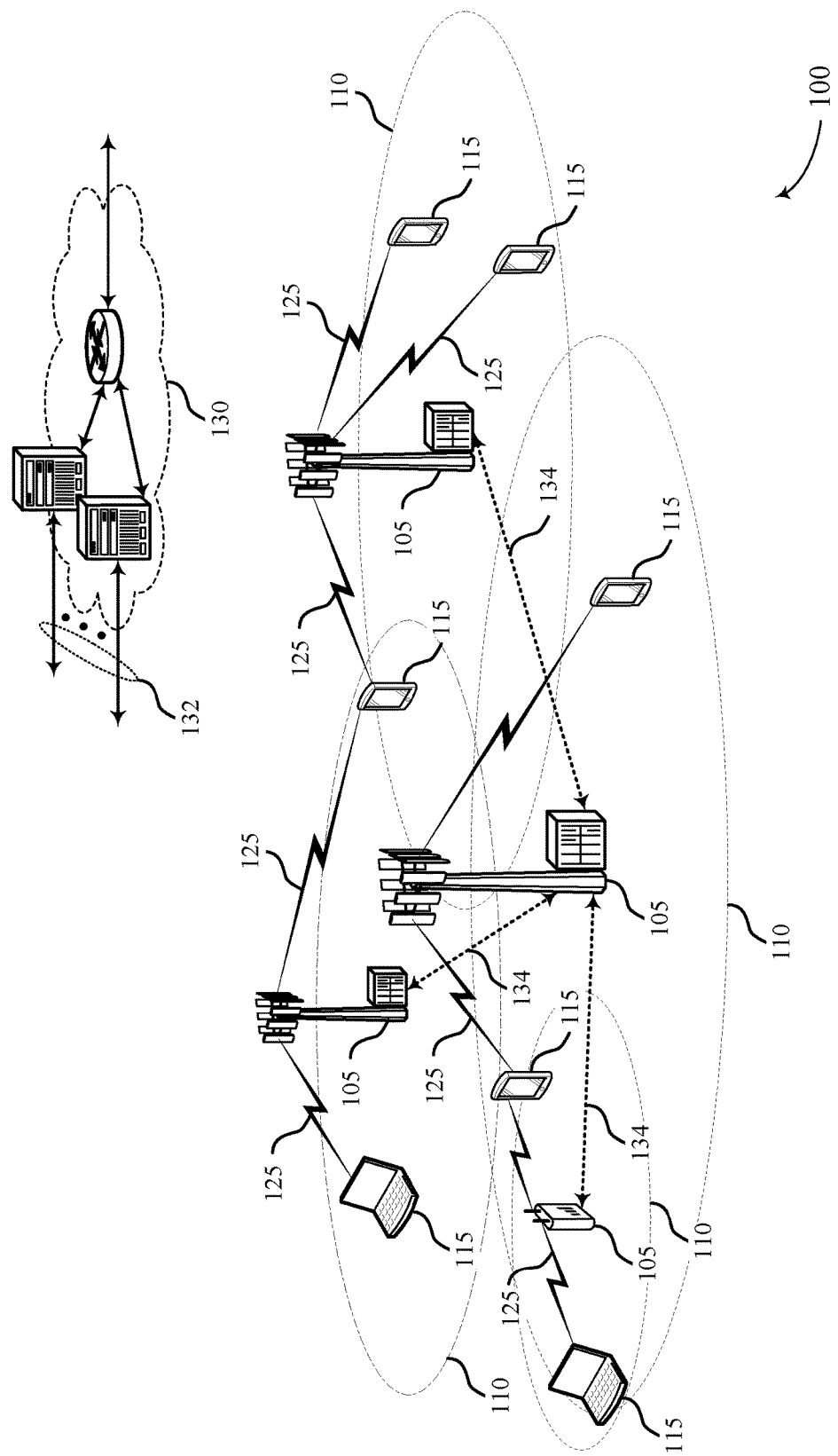
FIG. 1 illustrates an example of a system for wireless communication that supports reference signal resource location techniques in wireless communications in accordance with aspects of the present disclosure.

In a wireless communications system, such as millimeter wave (mmW) or a new radio (NR) system, a base station and a user equipment (UE) may utilize directional beams for communications. In cases where a base station does not know a particular direction of a UE, the base station may not know a directional beam that may be used for transmissions to the UE. In such cases, the base station may transmit multiple directional beams in a beam sweeping manner in multiple different directions in order to enhance the likelihood that such a UE will receive the transmission. In some cases, beam sweeping may be used for reference signal processes that may be used to find and maintain suitable beams to enable a communication link between the UE and the base station.

Further, for a given link the UE may measure channel quality and determine, for example, the appropriate rank and precoding matrix. In some examples, the base station may transmit a reference signal burst, such as a channel state information reference signal (CSI-RS) burst, which may be associated with sweeping or fixed base station transmission beams. To properly receive the transmission beams, the UE may use corresponding receive beams, which may be configured by selecting an appropriate UE antenna subarray with an adequate receive-directivity pattern (e.g., according to an antenna weight vector). In some reference signal processes, a base station may hold its beam constant over several symbols to enable the UE to try out different antenna subarrays, directivity patterns, or combinations thereof.

Depending on the reference signal process or resources used for reference signal transmissions, the UE may have to apply different antenna subarrays with different directivity patterns for different symbols. In some cases, determining parameters to apply for receiving reference signal transmissions may be relatively computationally intensive, and allowing a UE to prepare RF receive components for such operations in advance may allow for such processing to be performed under more relaxed timelines and potentially at reduced processing power. Further, a base station may benefit from flexibility in determining which slots to use for reference signal processes. However, signaling the UE at the beginning of a slot through a control information transmission that the reference signal process is to occur within the slot and using certain resources may require a relatively large amount of processing resources at the UE, which may result in increased processor size and power consumption.

Various aspects of the present disclosure provide that a base station may configure a number of reference signal processes, and a particular process for a slot may be identified based on the number of configured processes and a location of the slot within a radio frame. A UE may thus compute receive parameters and configure receive hardware based on the location of the slot, the number of configured processes, or combinations thereof. An indication may then be transmitted with a slot transmission that indicates whether the slot includes a reference signal transmission, and the UE, based on the indication, may attempt to receive the reference signal according to the configured process. In some cases, a reference signal process number may be equal to the slot number within a radio frame modulo N, where N is larger than the number of provisioned reference signal processes (e.g., N may be 4 or 8). This allows the UE to prepare the RF hardware for the appropriate sequence of receive-beams ahead of time, while also providing a base station with flexibility for scheduling non-periodic reference signals within slots.

Aspects of the disclosure are initially described in the context of a wireless communications system. Aspects of the disclosure are further illustrated by and described with reference to apparatus diagrams, system diagrams, and flowcharts that relate to reference signal resource location techniques in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE (or LTE-Advanced) network, or an NR network. In some cases, wireless communications system 100 may support enhanced broadband communications, ultra-reliable (i.e., mission critical) communications, low latency communications, and communications with low-cost and low-complexity devices using beamformed transmission beams.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) Gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched Streaming Service (PSS).

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam, or directional beam, in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). In some cases, reference signal processes (e.g., CSI-RS processes) may be configured in which a mmW receiver (e.g., a UE 115) may try multiple beams (e.g., antenna subarrays) while receiving the reference signals, and may use the multiple beams for measurements to establish or maintain communication link 125.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s = 1/30{,}720{,}000$ seconds). Time resources may be organized according to radio frames of length of 10 ms ($T_f = 307200 T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

As indicated above, in some examples a UE 115 and a base station 105 may use directional beams for communications, and may use beam sweeping techniques to find and maintain suitable beams to enable a communication link between the UE and the base station. In some cases, the base station 105 may configure a number of reference signal processes, and a particular process for a slot within a radio frame may be identified based on the number of configured processes, a location of the slot within the radio frame, or combinations thereof. The UE 115 may thus compute receive parameters and configure receive hardware based on the location of the slot and the number of configured processes. The base station 105 may transmit an indication (e.g., in DCI in the slot) that indicates whether the slot includes a reference signal transmission, and the UE 115, based on the indication, may attempt to receive the reference signal according to the configured process.

Figure 2:
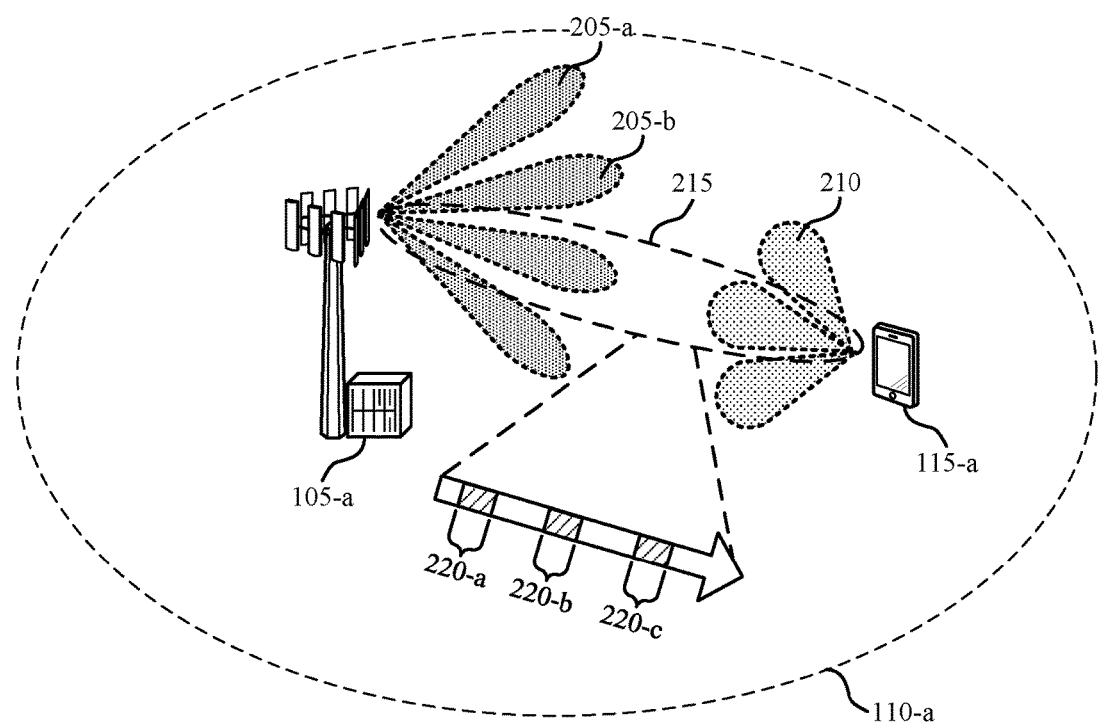
FIG. 2 illustrates an example of a wireless communication system that supports reference signal resource location techniques in wireless communications in accordance with aspects of the present disclosure.

FIG. 2 illustrates an example of a wireless communication system 200 that supports reference signal resource location techniques in wireless communications in accordance with various aspects of the present disclosure. Wireless communication system 200 includes a base station 105-a and a UE 115-a, each of which may be an example of the corresponding device described with reference to FIG. 1.

Wireless communication system 200 may operate in frequency ranges that are associated with beamformed transmissions between base station 105-a and UE 115-a. For example, wireless communication system 200 may operate using mmW frequency ranges. As a result, signal processing techniques, such as beamforming may be used to combine energy coherently and overcome path losses. By way of example, base station 105-a may contain multiple antennas. In some cases, each antenna may transmit a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit the wireless communication system 200.

Transmit beams 205-a and 205-b represent examples of beams over which information may be transmitted. Accordingly, each transmit beam 205 may be directed from base station 105-a toward a different region of the coverage area 110-a and in some cases, two or more beams may overlap. Transmit beams 205-a and 205-b may be transmitted simultaneously or at different times. In either case, a UE 115-a may be capable of receiving one or more transmit beams 205 via respective receive beams 210.

In one example, UE 115-a may form one or more receive beams 210. Similar to base station 105-a, UE 115-a may contain multiple antennas. In some cases, the receive beams 210 may receive a single transmit beam 205. A transmit beam 205 and a corresponding receive beam 210 may in some cases be referred to as a beam pair link 215. Various methods for identifying a desired beam pair link 215 are considered within the scope of the present disclosure. For example, in some cases base station 105-a may repeat transmissions over multiple transmit beams 205 (e.g., in every direction) and UE 115-a may report the strongest received beam (e.g., without necessarily trying multiple receive beams 210). Additionally or alternatively, base station 105-a may transmit multiple transmit beams 205 over a small angular region (e.g., to assist a UE 115-a in fine-tuning the selected transmit beam 205). Further, in some cases, base station 105-a may repeat transmission of a single transmit beam (e.g., transmit beam 205-a) multiple times (e.g., to allow UE 115-a to compare multiple receive beams 210).

In some examples, transmit beams 205 may carry downlink transmissions which may include CSI-RS 220, and different CSI-RS processes may be configured at different slots within a radio frame, thus providing multiple transmission such as first CSI-RS transmission 220-a, second CSI-RS transmission 220-b, and third CSI-RS transmission 220-c. Base station 105-a may transmit to UE 115-a using multiple transmit beams 205, and UE 115-a may use different antenna sub-arrays to create various receive beams 210. For instance, during a cell acquisition procedure, the UE 115-a may receive one or more transmit beams 205 using different receive beams 210 and may determine the transmit beam 205 and receive beam 210 pairing that has the strongest signal (i.e., has the highest measured signal strength or highest signal to noise ratio (SNR), etc.). Throughout communications, the UE 115-a may reassess the transmit beam and receive beam pairing (e.g., which may be referred to as beam management).

As discussed above, the base station 105-a may configure a number of reference signal processes. Each of the processes may be associated with, for example, a coarse beam search or fine tuning of a given beam (e.g., different processes for different antenna ports or combinations of antenna ports may be performed concurrently). A particular process for a slot may be identified based on the number of configured processes and a slot index (e.g., as the slot index modulo the number of configured processes). The UE 115-a may thus compute receive parameters and configure receive hardware based on the location of the slot and the number of configured processes. The base station 105-a may transmit an indication (e.g., in DCI in the slot) that indicates whether the slot includes a reference signal transmission (e.g., a CSI-RS 220 transmission), and the UE 115, based on the indication, may attempt to receive the reference signal according to the configured process.

Figure 3:
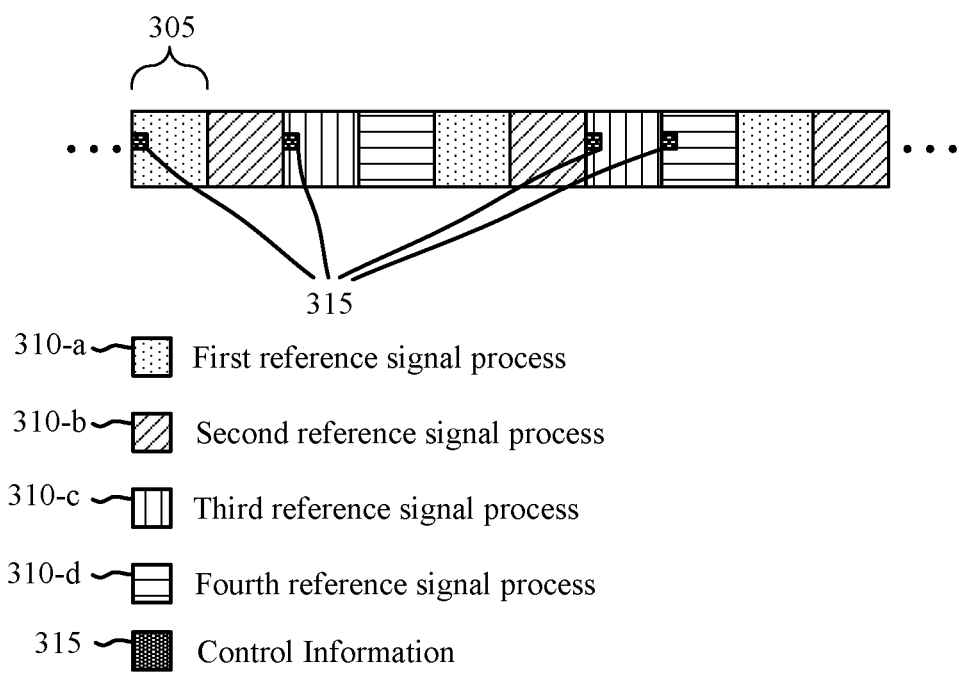
FIG. 3 illustrates an example of reference signal resources that support reference signal resource location techniques in wireless communications in accordance with aspects of the present disclosure.

FIG. 3 illustrates an example of reference signal resources 300 that support reference signal resource location techniques in wireless communications in accordance with various aspects of the present disclosure. In some examples, reference signal resources 300 may be used to implement aspects of wireless communication system 100.

In the example of FIG. 3, a number of slots 305 may be configured, and each slot 305 may have an associated reference signal process, such as a CSI-RS process. In this example, four reference signal processes 310 may be configured, which may include first reference signal process 310-*a*, second reference signal process 310-*b*, third reference signal process 310-*c*, and fourth reference signal process 310-*d*. The particular reference signal process 310 for a slot 305 may be identified based on the number of configured reference signal processes 310 and a location of the slot 305 within a radio frame. For example, a radio frame may include ten subframes, with each subframe having two slots 305, thus providing 20 slots in a radio frame. Each slot 305 may be identified by a slot index (e.g., slot 0 through slot 19 in a radio frame). Further, each reference signal process 310 may have a process number. In some examples, the particular reference signal process 310 for a slot 305 may be determined based on the number of reference signal processes 310 and a slot 305 location within the radio frame. In some examples, the reference signal process 310 number for a slot 305 may be equal to the slot 305 number within the radio frame modulo N, where N is larger than the number of configured reference signal processes. In the example of FIG. 3, N may be 4 and thus the first reference signal process 310-*a* may be configured in every fourth slot 305. In other examples, the slot index or subframe index used for determining the reference signal process 310 may be a system index such as a system frame number or system slot number (e.g., within a range of 0-1023, etc.). Thus, the reference signal processes may not have the same ordering between different frames.

An indication may then be transmitted in control information 315 within a slot 305 that indicates whether the slot 305 includes a reference signal transmission for a reference signal process 310, and the UE, based on the indication, may attempt to receive the reference signal according to the configured process. This allows the UE to prepare the RF hardware for the appropriate sequence of receive-beams ahead of time, while also providing a base station with flexibility for scheduling reference signal processes within slots.

Figure 4:
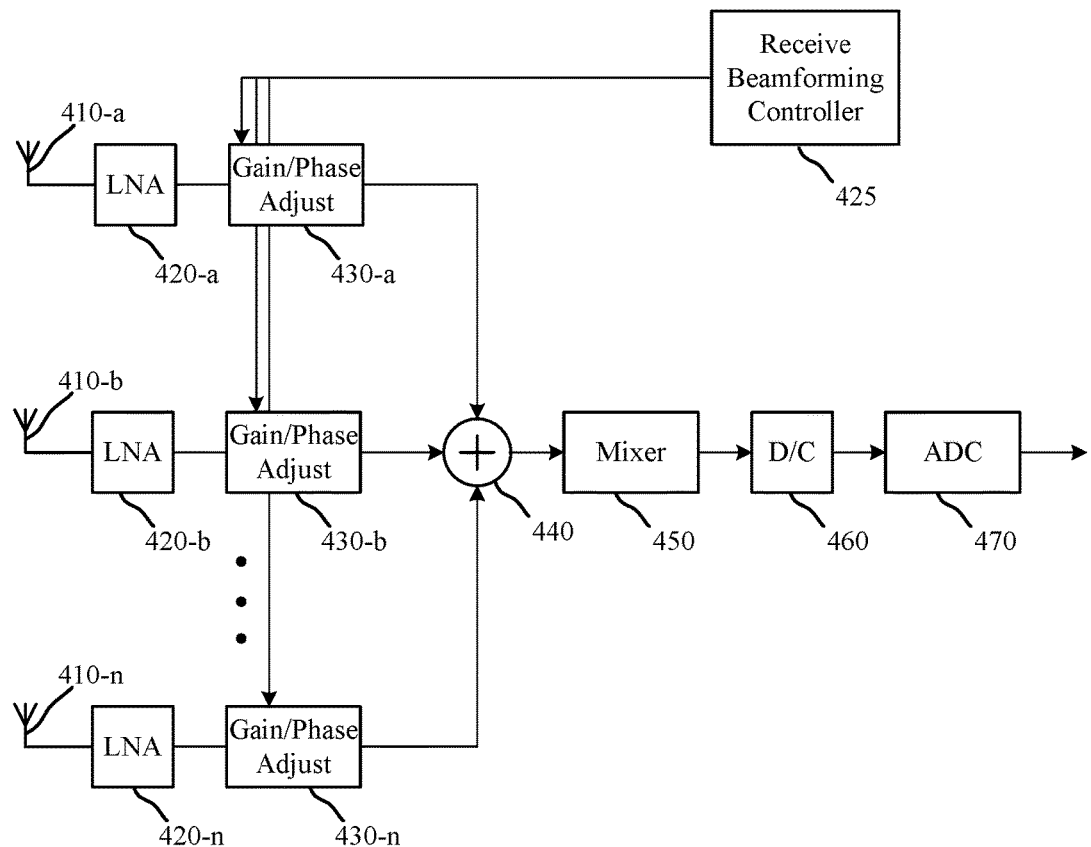
FIG. 4 illustrates an example of receive circuitry that supports reference signal resource location techniques in wireless communications in accordance with aspects of the present disclosure.

FIG. 4 illustrates an example of receive circuitry 400 that supports reference signal resource location techniques in wireless communications in accordance with various aspects of the present disclosure. In some examples, receive circuitry 400 may implement aspects of wireless communication system 100.

Receive circuitry 400 may include a number of receive antennas 410 that are each coupled with a low noise amplifier (LNA) 420 and a gain/phase adjustment component 430. A receive beamforming controller 425 may control the gain/phase adjustment components 430 based on a receive beam that may be configured for a particular slot. Adder 440 may combine the outputs of the gain/phase adjustment components 430, and output an added signal to mixer 450, downconverter 460, and analog-to-digital converter 470.

In some examples, a UE may configure receive circuitry based on various transmission beam parameters of a transmission beam of interest. Depending on the reference signal process or resource set, the receive beamforming controller 425 may apply different antenna subarrays with different directivity patterns for different symbols, by adjusting LNAs 420 and gain/phase adjust components 430 to achieve the desired directionality in the receive beam. In some cases, receive circuitry may be implemented as analog circuitry in a UE receiver, which may require additional time prior to receiving a signal to properly set, which may add to the UE processing timeline constraints as discussed above. In examples where receive beamforming controller 425 may compute the relevant parameters prior to a slot, the UE may have additional processing time, which may allow for a lower complexity processor or lower cost components and may reduce cost and power consumption.

Figure 5:
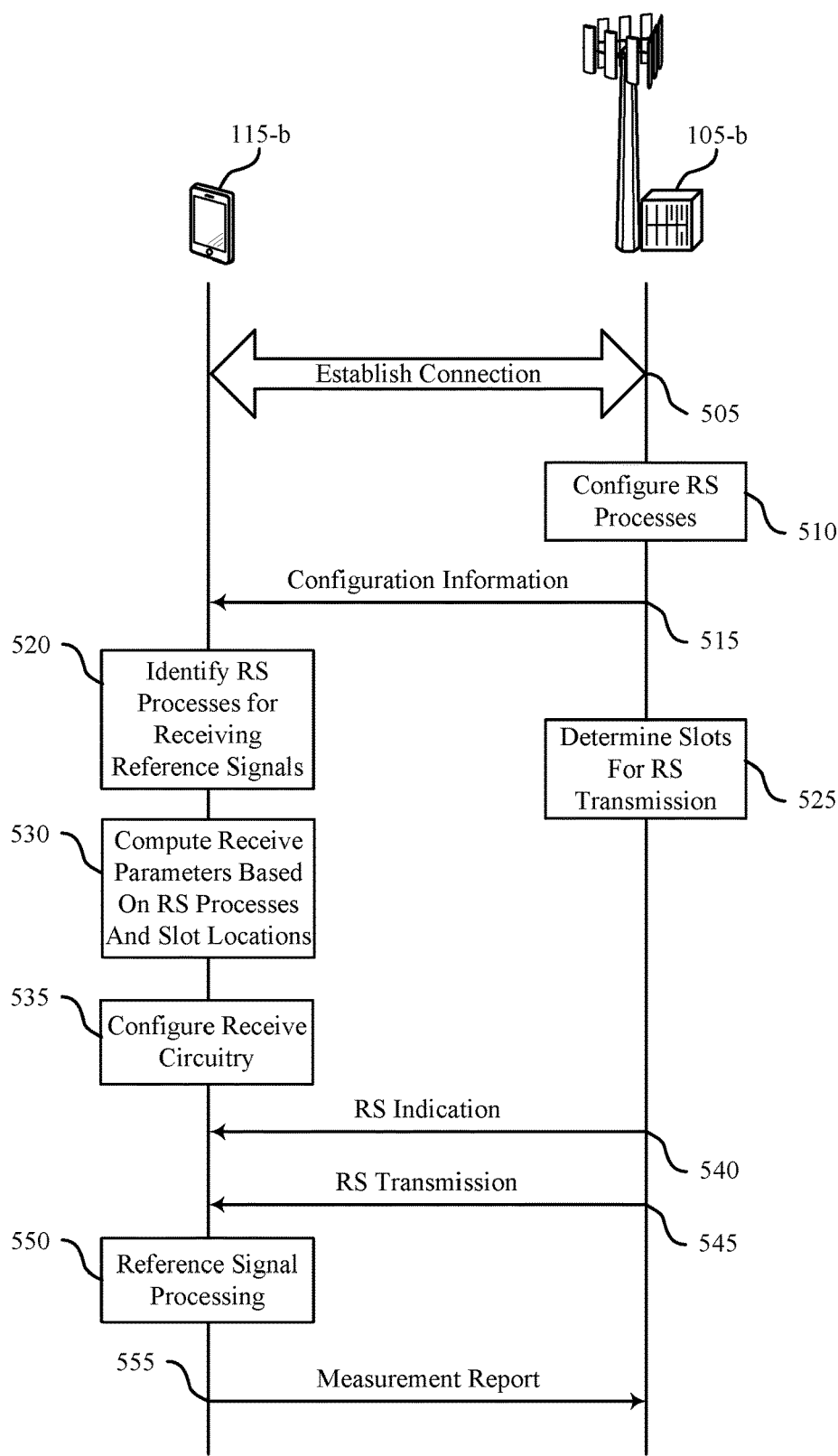
FIG. 5 illustrates an example of a process flow that supports reference signal resource location techniques in wireless communications in accordance with aspects of the present disclosure.

FIG. 5 illustrates an example of a process flow 500 that supports reference signal resource location techniques in wireless communications in accordance with various aspects of the present disclosure. In some examples, process flow 500 may implement aspects of wireless communication system 100. Process flow 500 includes a UE 115-*b* and base station 105-*b*, each of which may be an example of the corresponding device described above with reference to FIGS. 1 and 2.

At 505, base station 105-*b* and UE 115-*b* may establish a communication link (e.g., which may be an example of a communication link 125 as described with reference to FIG. 1). For example, the communication link at 505 may support beamformed communications. In some cases, a beam pair link may be established using a beam sweep procedure in which the base station 105-*b* may repeat transmissions over multiple transmit beams and UE 115-*b* may report the strongest received beam. Additionally or alternatively, base station 105-*b* may transmit multiple transmit beams over a small angular region to assist UE 115-*b* in fine-tuning the selected transmit beam.

At 510, base station 105-*b* may configure reference signal processes. In some cases, the reference signal processes may include a number of processes, and one of the processes may be selected for a particular slot based on one of more of the number of processes and a location of the slot (e.g., as the slot index modulo the number of processes, etc.). In some cases, the processes may include time resources for reference signal transmissions, frequency resources for reference signal transmissions, of combinations thereof. In some cases, the reference signal processes may also include tuning parameters that may allow fine tuning for transmission beams. The base station 105-*b* may transmit configuration information 515 to UE 115-*b*, which may include the configured reference signal processes.

At 520, the UE 115-*b* may identify reference signal processes for receiving reference signals. Such identification may include identifying time resources, frequency resources, or combinations thereof, which may be identified separately for different slots within a radio frame, based on one of more of the number of reference signal processes and a location of the particular slot within the radio frame. In some cases, a reference signal process number may be equal to the slot number within a radio frame modulo N, where N is larger than the number of provisioned reference signal processes (e.g., N may be 4 or 8). This allows the UE 115-*b* to prepare the RF hardware for the appropriate sequence of receive-beams ahead of time, while also providing a base station with flexibility for scheduling non-periodic reference signals within slots.

At 530, the UE 115-*b* may compute receive parameters based on the reference signal processes and the slot locations. In some cases, the parameters may be computed for which antennas of antenna sub-array at the UE 115-*b* are to be used, as well as weights and phase shifts that are to be applied at each antenna.

At 535, the UE 115-*b* may configure receive circuitry. The configuration of the receive circuitry may include configuring various analog RF components according to the receive parameters that were computed. In some examples, a receive beamforming controller at UE 115-*b* may apply different antenna subarrays with different directivity patterns for different symbols, by adjusting LNAs and gain/phase adjust components to achieve the desired directionality in the receive beam.

The base station 105-*b*, at 525, may determine slots for reference signal transmissions. In some cases, the base station 105-*b* may determine slots for reference signal processes based on various factors, such as channel quality aspects, timing since prior reference signal processes, or one or more other factors. In the event that the base station 105-*b* determines that a reference signal process is to be configured for a slot, the base station 105-*b* may, for example, set a flag to indicate the presence or absence of a reference signal transmission in the slot. Such an indication 540 may be transmitted to the UE 115-*b* followed by a reference signal transmission 545 in the resources that were configured for the slot. Such determination at the base station 105-*b* may allow the base station to schedule non-periodic reference signal transmissions, as periodic reference signal transmissions would be preconfigured and transmitted without an indication of the presence of absence of a reference signal transmission.

The UE 115-*b*, at 550 may perform reference signal processing, and in some cases may transmit a measurement report 555 to the base station 105-*b*. The reference signal processing may include channel state measurements, which may include energy measurements for a reference signal, interference and noise measurements, or any combination thereof.

Figure 6:
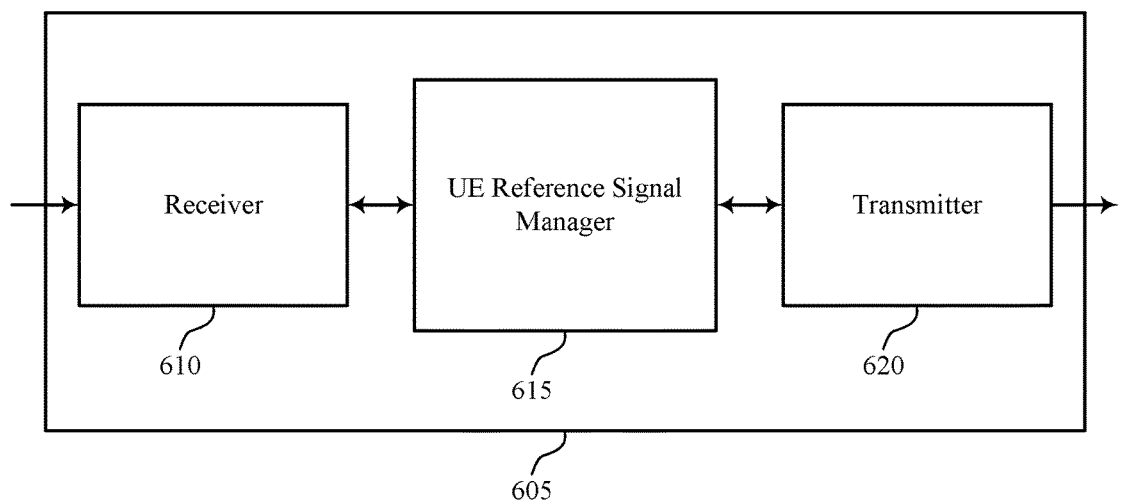
FIGS. 6 through 8 show block diagrams of a device that supports reference signal resource location techniques in wireless communications in accordance with aspects of the present disclosure.

FIG. 6 shows a block diagram 600 of a wireless device 605 that supports reference signal resource location techniques in wireless communications in accordance with aspects of the present disclosure. Wireless device 605 may be an example of aspects of a user equipment (UE) 115 as described herein. Wireless device 605 may include receiver 610, UE reference signal manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to reference signal resource location techniques in wireless communications, etc.). Information may be passed on to other components of the device. The receiver 610 may be an example of aspects of the transceiver 935 described with reference to FIG. 9. The receiver 610 may utilize a single antenna or a set of antennas.

UE reference signal manager 615 may be an example of aspects of the UE reference signal manager 915 described with reference to FIG. 9.

UE reference signal manager 615 and/or at least some of its various sub-components may be implemented in hardware, software executed by a processor, firmware, or any combination thereof. If implemented in software executed by a processor, the functions of the UE reference signal manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE reference signal manager 615 and/or at least some of its various sub-components may be physically located at various positions, including being distributed such that portions of functions are implemented at different physical locations by one or more physical devices. In some examples, UE reference signal manager 615 and/or at least some of its various sub-components may be a separate and distinct component in accordance with various aspects of the present disclosure. In other examples, UE reference signal manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE reference signal manager 615 may identify, for at least one of a set of slots, a corresponding reference signal process of a set of configured reference signal processes based on one or more of a location of the slot and a number of the set of configured reference signal processes, configure receive circuitry to receive a reference signal transmission over a receive beam in the at least one of the set of slots based on the corresponding reference signal process, receive a control signal that indicates a presence of the reference signal transmission within the at least one of the set of slots, and receive the reference signal in the at least one of the set of slots based on the control signal and the configured receive circuitry.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
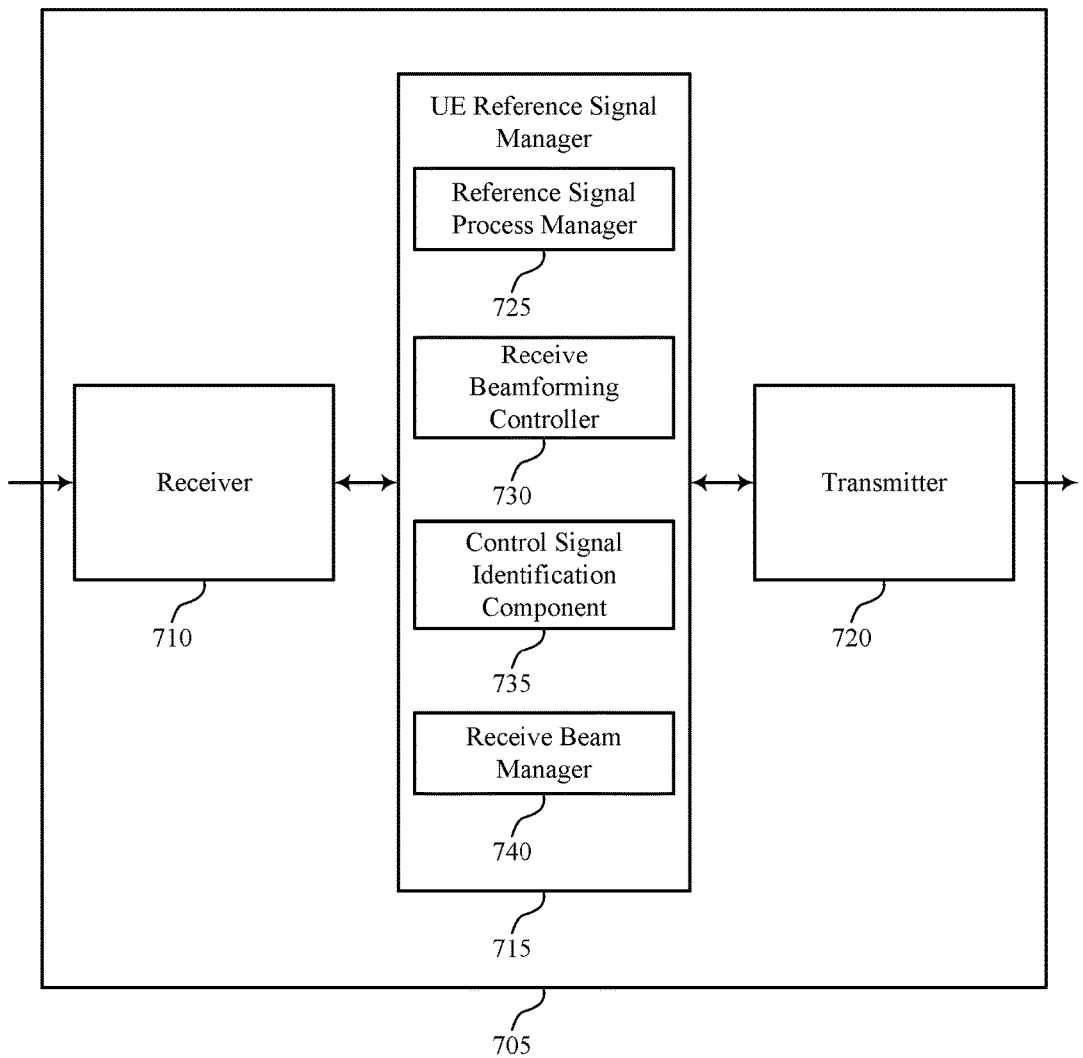

FIG. 7 shows a block diagram 700 of a wireless device 705 that supports reference signal resource location techniques in wireless communications in accordance with aspects of the present disclosure. Wireless device 705 may be an example of aspects of a wireless device 605 or a UE 115 as described with reference to FIG. 6. Wireless device 705 may include receiver 710, UE reference signal manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to reference signal resource location techniques in wireless communications, etc.). Information may be passed on to other components of the device. The receiver 710 may be an example of aspects of the transceiver 935 described with reference to FIG. 9. The receiver 710 may utilize a single antenna or a set of antennas.

UE reference signal manager 715 may be an example of aspects of the UE reference signal manager 915 described with reference to FIG. 9. UE reference signal manager 715 may also include reference signal process manager 725, receive beamforming controller 730, control signal identification component 735, and receive beam manager 740.

Reference signal process manager 725 may identify, for at least one of a set of slots, a corresponding reference signal process of a set of configured reference signal processes based on one or more of a location of the slot and a number of the set of configured reference signal processes. In some cases, reference signal process manager 725 may receive radio resource control (RRC) signaling with configuration information for the set of configured reference signal processes. In some cases, each of the set of configured reference signal processes includes one or more of time resources or frequency resources configured for an associated reference signal transmission.

Receive beamforming controller 730 may configure receive circuitry to receive a reference signal transmission over a receive beam in the at least one of the set of slots based on the corresponding reference signal process. For example, depending on the reference signal process or resource set, the receive beamforming controller 730 may apply different antenna subarrays with different directivity patterns for different symbols, by adjusting LNAs and gain/phase adjust components to achieve the desired directionality in the receive beam. In some cases, receive circuitry may be implemented as analog circuitry in a UE receiver, which may require additional time prior to receiving a signal to properly set, which may add to the UE processing timeline constraints as discussed above. In examples where receive beamforming controller 730 may compute the relevant parameters prior to a slot, the UE may have additional processing time.

Control signal identification component 735 may receive a control signal that indicates a presence of the reference signal transmission within the at least one of the set of slots. In some cases, the control signal includes an indication in downlink control information (DCI) within the at least one of the set of slots.

Receive beam manager 740 may receive the reference signal in the at least one of the set of slots based on the control signal and the configured receive circuitry. The received reference signal may be processed to perform channel state measurements, which may include energy measurements for a reference signal, interference and noise measurements, or any combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
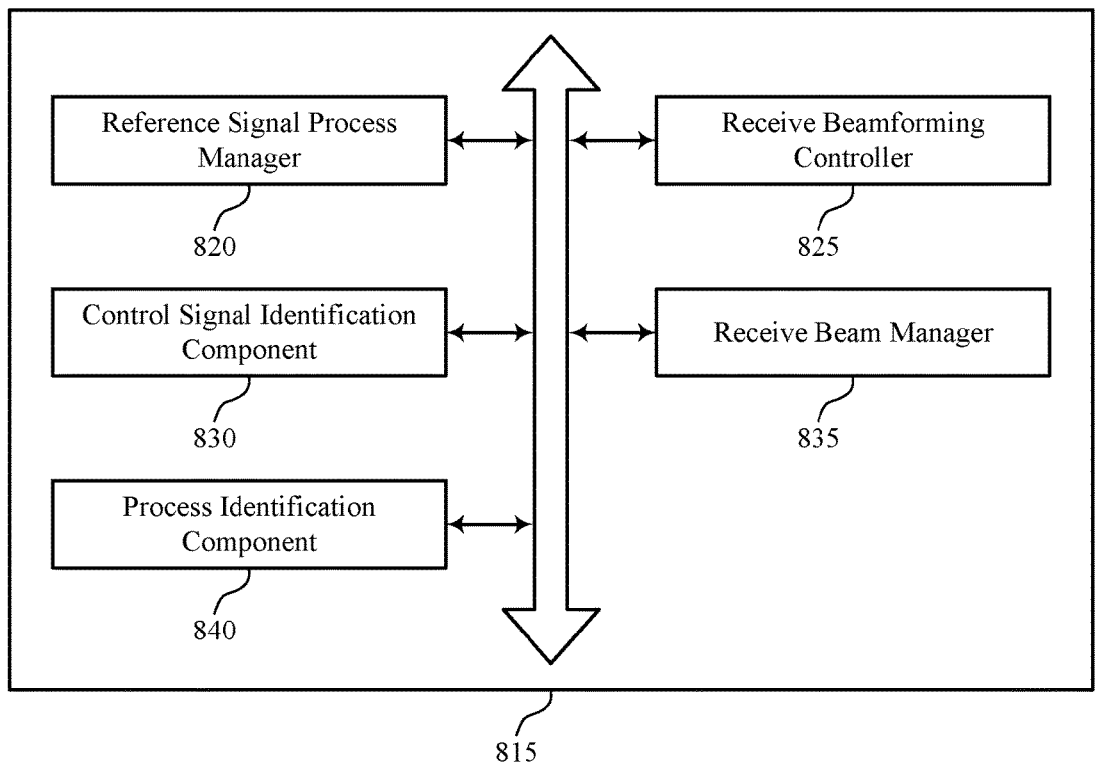

FIG. 8 shows a block diagram 800 of a UE reference signal manager 815 that supports reference signal resource location techniques in wireless communications in accordance with aspects of the present disclosure. The UE reference signal manager 815 may be an example of aspects of a UE reference signal manager 615, a UE reference signal manager 715, or a UE reference signal manager 915 described with reference to FIGS. 6, 7, and 9. The UE reference signal manager 815 may include reference signal process manager 820, receive beamforming controller 825, control signal identification component 830, receive beam manager 835, and process identification component 840. Each of these modules may communicate, directly or indirectly, with one another (e.g., via one or more buses).

Reference signal process manager 820 may identify, for at least one of a set of slots, a corresponding reference signal process of a set of configured reference signal processes based on one or more of a location of the slot and a number of the set of configured reference signal processes. Reference signal process manager 820 may also receive RRC signaling with configuration information for the set of configured reference signal processes. In some cases, each of the set of configured reference signal processes includes one or more of time resources or frequency resources configured for an associated reference signal transmission.

Receive beamforming controller 825 may configure receive circuitry to receive a reference signal transmission over a receive beam in the at least one of the set of slots based on the corresponding reference signal process. For example, depending on the reference signal process or resource set, the receive beamforming controller 825 may apply different antenna subarrays with different directivity patterns for different symbols, by adjusting LNAs and gain/phase adjust components to achieve the desired directionality in the receive beam. In some cases, receive circuitry may be implemented as analog circuitry in a UE receiver, which may require additional time prior to receiving a signal to properly set, which may add to the UE processing timeline constraints as discussed above. In examples where receive beamforming controller 825 may compute the relevant parameters prior to a slot, the UE may have additional processing time.

Control signal identification component 830 may receive a control signal that indicates a presence of the reference signal transmission within the at least one of the set of slots. In some cases, the control signal includes an indication in DCI within the at least one of the set of slots.

Receive beam manager 835 may receive the reference signal in the at least one of the set of slots based on the control signal and the configured receive circuitry. The received reference signal may be processed to perform channel state measurements, which may include energy measurements for a reference signal, interference and noise measurements, or any combination thereof.

Process identification component 840 may identify reference signal processes. In some cases, the corresponding reference signal process of the set of configured reference signal processes is identified as a slot index modulo the number of the set of configured reference signal processes.

Figure 9:
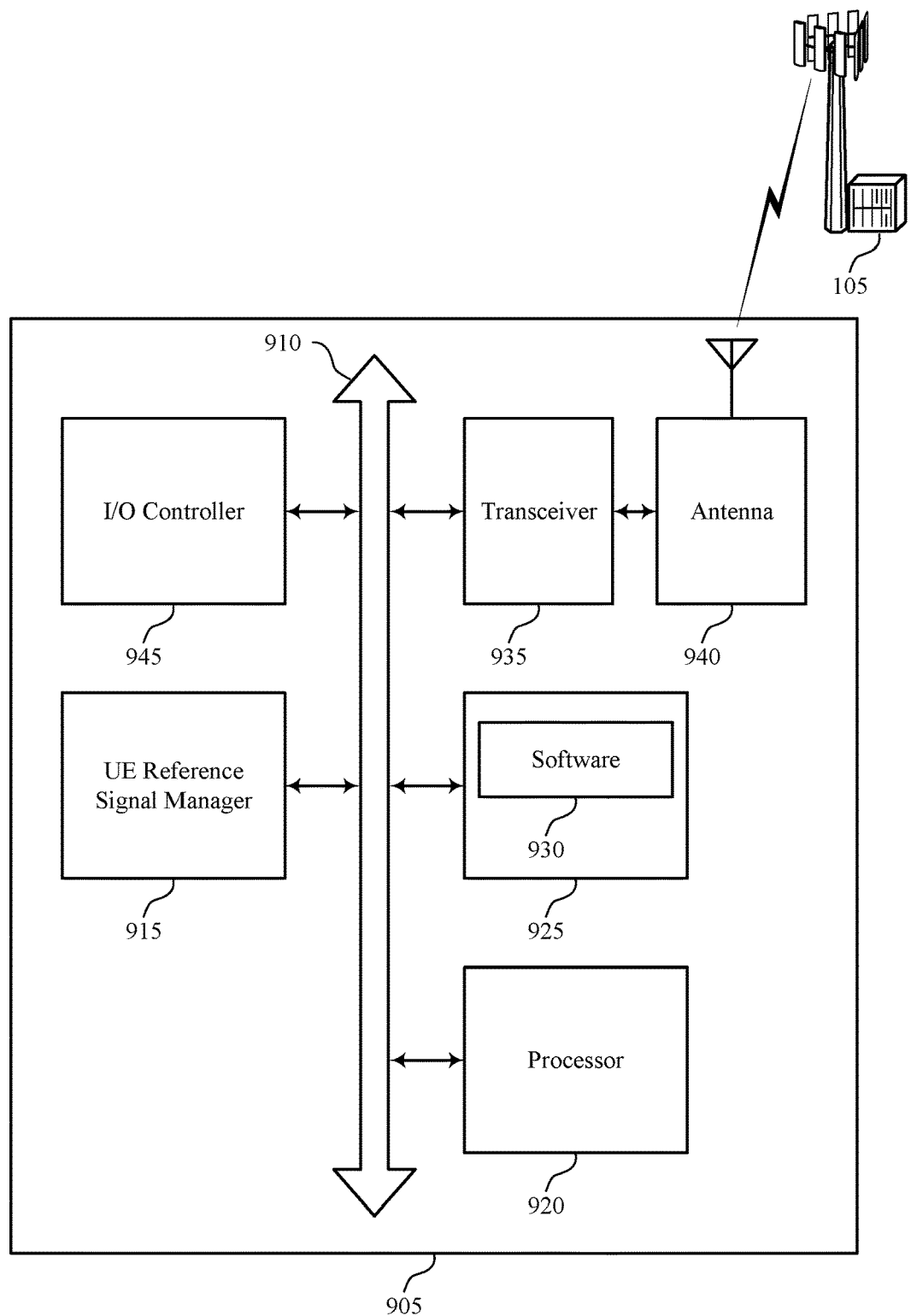
FIG. 9 illustrates a block diagram of a system including a UE that supports reference signal resource location techniques in wireless communications in accordance with aspects of the present disclosure.

FIG. 9 shows a diagram of a system 900 including a device 905 that supports reference signal resource location techniques in wireless communications in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE reference signal manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting reference signal resource location techniques in wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support reference signal resource location techniques in wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
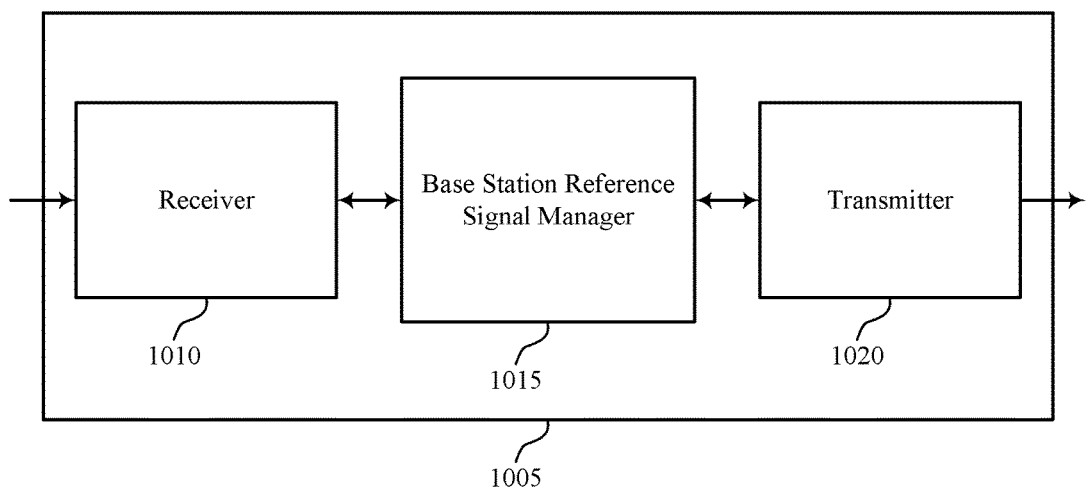
FIGS. 10 through 12 show block diagrams of a device that supports reference signal resource location techniques in wireless communications in accordance with aspects of the present disclosure.

FIG. 10 shows a block diagram 1000 of a wireless device 1005 that supports reference signal resource location techniques in wireless communications in accordance with aspects of the present disclosure. Wireless device 1005 may be an example of aspects of a base station 105 as described herein. Wireless device 1005 may include receiver 1010, base station reference signal manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to reference signal resource location techniques in wireless communications, etc.). Information may be passed on to other components of the device. The receiver 1010 may be an example of aspects of the transceiver 1335 described with reference to FIG. 13. The receiver 1010 may utilize a single antenna or a set of antennas.

Base station reference signal manager 1015 may be an example of aspects of the base station reference signal manager 1315 described with reference to FIG. 13.

Base station reference signal manager 1015 and/or at least some of its various sub-components may be implemented in hardware, software executed by a processor, firmware, or any combination thereof. If implemented in software executed by a processor, the functions of the base station reference signal manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station reference signal manager 1015 and/or at least some of its various sub-components may be physically located at various positions, including being distributed such that portions of functions are implemented at different physical locations by one or more physical devices. In some examples, base station reference signal manager 1015 and/or at least some of its various sub-components may be a separate and distinct component in accordance with various aspects of the present disclosure. In other examples, base station reference signal manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station reference signal manager 1015 may configure a UE with a set of reference signal processes for receiving and processing one or more reference signals to be transmitted in one or more slots of a set of slots, each slot of the set of slots having a corresponding reference signal process of the set of reference signal processes based on one or more of a location of the slot and a number of the set of configured reference signal processes, determine that a non-periodic reference signal is to be transmitted via a transmit beam in a first slot of the set of slots, transmit a control signal to indicate a presence of the reference signal in the first slot, and transmit the reference signal in the first slot via the transmit beam.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
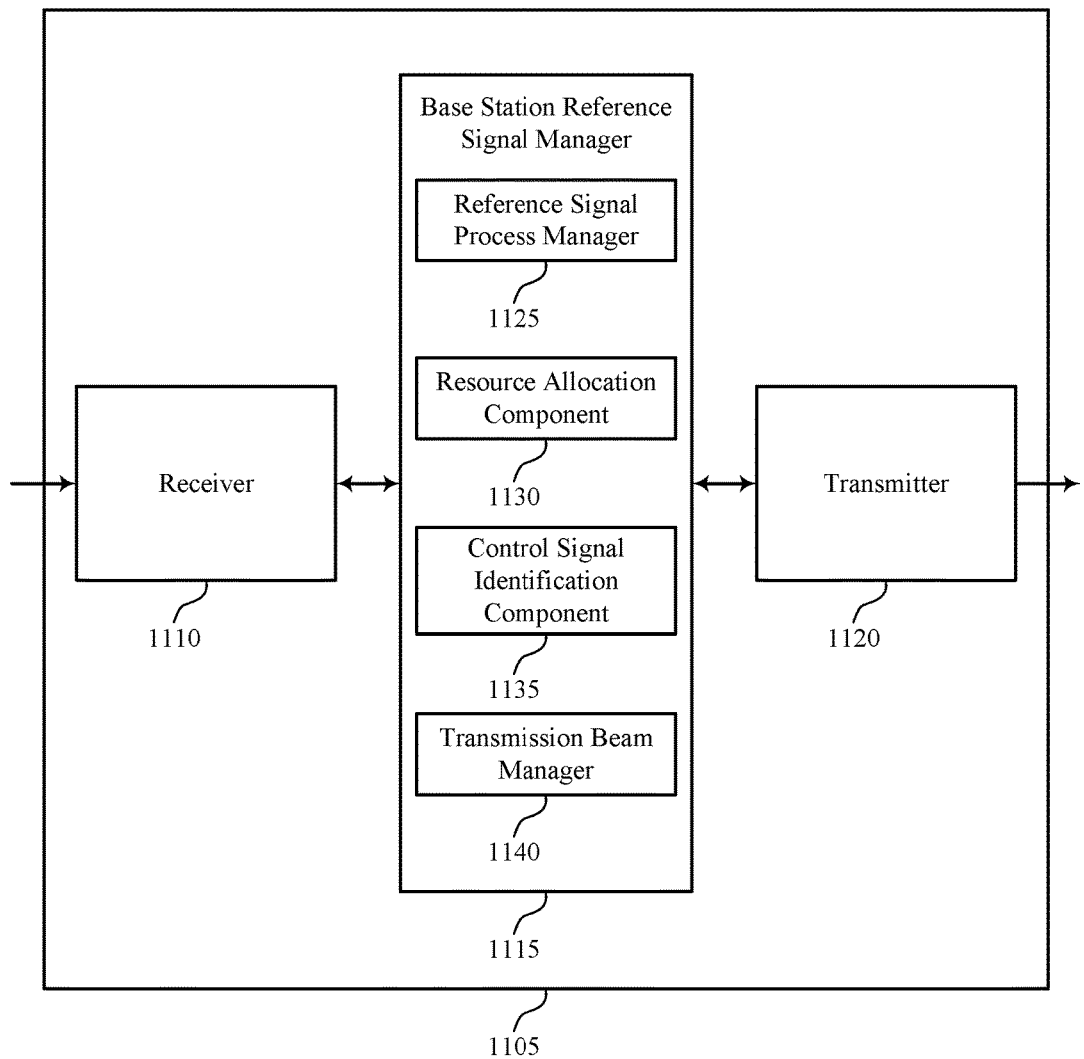

FIG. 11 shows a block diagram 1100 of a wireless device 1105 that supports reference signal resource location techniques in wireless communications in accordance with aspects of the present disclosure. Wireless device 1105 may be an example of aspects of a wireless device 1005 or a base station 105 as described with reference to FIG. 10. Wireless device 1105 may include receiver 1110, base station reference signal manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to reference signal resource location techniques in wireless communications, etc.). Information may be passed on to other components of the device. The receiver 1110 may be an example of aspects of the transceiver 1335 described with reference to FIG. 13. The receiver 1110 may utilize a single antenna or a set of antennas.

Base station reference signal manager 1115 may be an example of aspects of the base station reference signal manager 1315 described with reference to FIG. 13.

Base station reference signal manager 1115 may also include reference signal process manager 1125, resource allocation component 1130, control signal identification component 1135, and transmission beam manager 1140.

Reference signal process manager 1125 may configure a UE with a set of reference signal processes for receiving and processing one or more reference signals to be transmitted in one or more slots of a set of slots, each slot of the set of slots having a corresponding reference signal process of the set of reference signal processes based on one or more of a location of the slot and a number of the set of configured reference signal processes. In some cases, each of the set of reference signal processes includes one or more of time resources or frequency resources configured for an associated reference signal transmission. In some cases, the configuring includes transmitting RRC signaling with configuration information for the set of reference signal processes to the UE.

Resource allocation component 1130 may determine that a reference signal is to be transmitted in a first slot of the set of slots. In some cases, resource allocation component 1130 may determine slots for reference signal processes based on various factors, such as channel quality aspects, timing since prior reference signal processes, or one or more other factors. Control signal identification component 1135 may transmit a control signal in the first slot to indicate a presence of the reference signal in the first slot. In some cases, the transmitting the control signal includes setting an indicator in DCI of the first slot to indicate the presence or absence of the reference signal in the first slot. Transmission beam manager 1140 may transmit the reference signal in the first slot.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
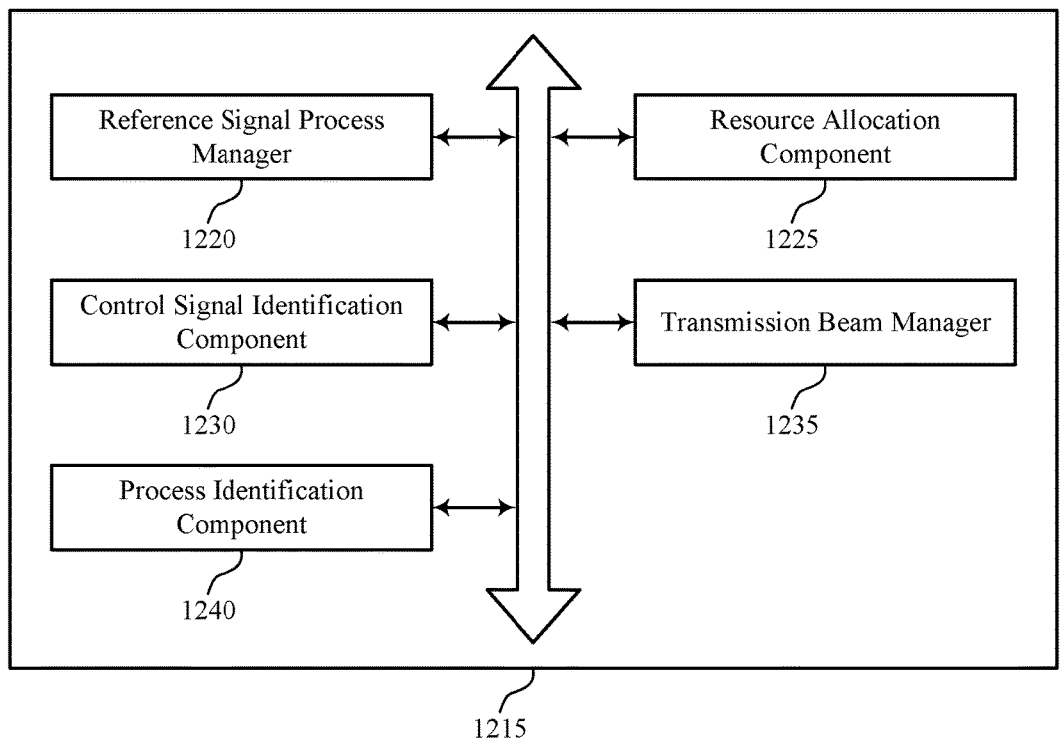

FIG. 12 shows a block diagram 1200 of a base station reference signal manager 1215 that supports reference signal resource location techniques in wireless communications in accordance with aspects of the present disclosure. The base station reference signal manager 1215 may be an example of aspects of a base station reference signal manager 1315 described with reference to FIGS. 10, 11, and 13. The base station reference signal manager 1215 may include reference signal process manager 1220, resource allocation component 1225, control signal identification component 1230, transmission beam manager 1235, and process identification component 1240. Each of these modules may communicate, directly or indirectly, with one another (e.g., via one or more buses).

Reference signal process manager 1220 may configure a UE with a set of reference signal processes for receiving and processing one or more reference signals to be transmitted in one or more slots of a set of slots, each slot of the set of slots having a corresponding reference signal process of the set of reference signal processes based on a location of the slot and a number of the set of configured reference signal processes. In some cases, each of the set of reference signal processes includes one or more of time resources or frequency resources configured for an associated reference signal transmission. In some cases, the configuring includes transmitting RRC signaling with configuration information for the set of reference signal processes to the UE.

Resource allocation component 1225 may determine that a reference signal is to be transmitted in a first slot of the set of slots. In some cases, resource allocation component 1130 may determine slots for reference signal processes based on various factors, such as channel quality aspects, timing since prior reference signal processes, or one or more other factors. Control signal identification component 1230 may transmit a control signal in the first slot to indicate a presence of the reference signal in the first slot. In some cases, the transmitting the control signal includes setting an indicator in DCI of the first slot to indicate the presence or absence of the reference signal in the first slot. Transmission beam manager 1235 may transmit the reference signal in the first slot.

Process identification component 1240 may identify reference signal processes. In some cases, the corresponding reference signal process of the set of configured reference signal processes is identified as a slot index modulo the number of the set of configured reference signal processes.

Figure 13:
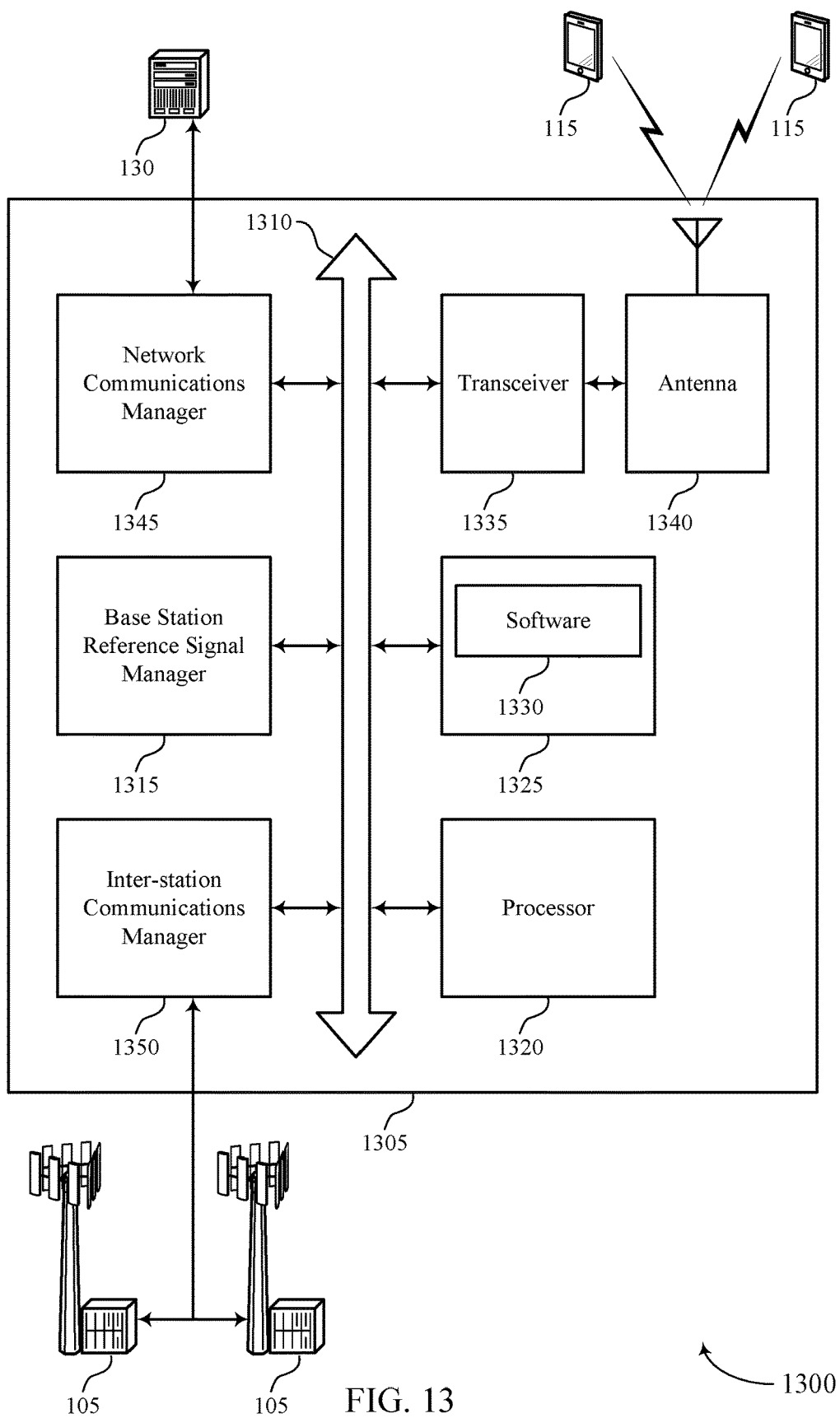
FIG. 13 illustrates a block diagram of a system including a base station that supports reference signal resource location techniques in wireless communications in accordance with aspects of the present disclosure.

FIG. 13 shows a diagram of a system 1300 including a device 1305 that supports reference signal resource location techniques in wireless communications in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station reference signal manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting reference signal resource location techniques in wireless communications).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support reference signal resource location techniques in wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
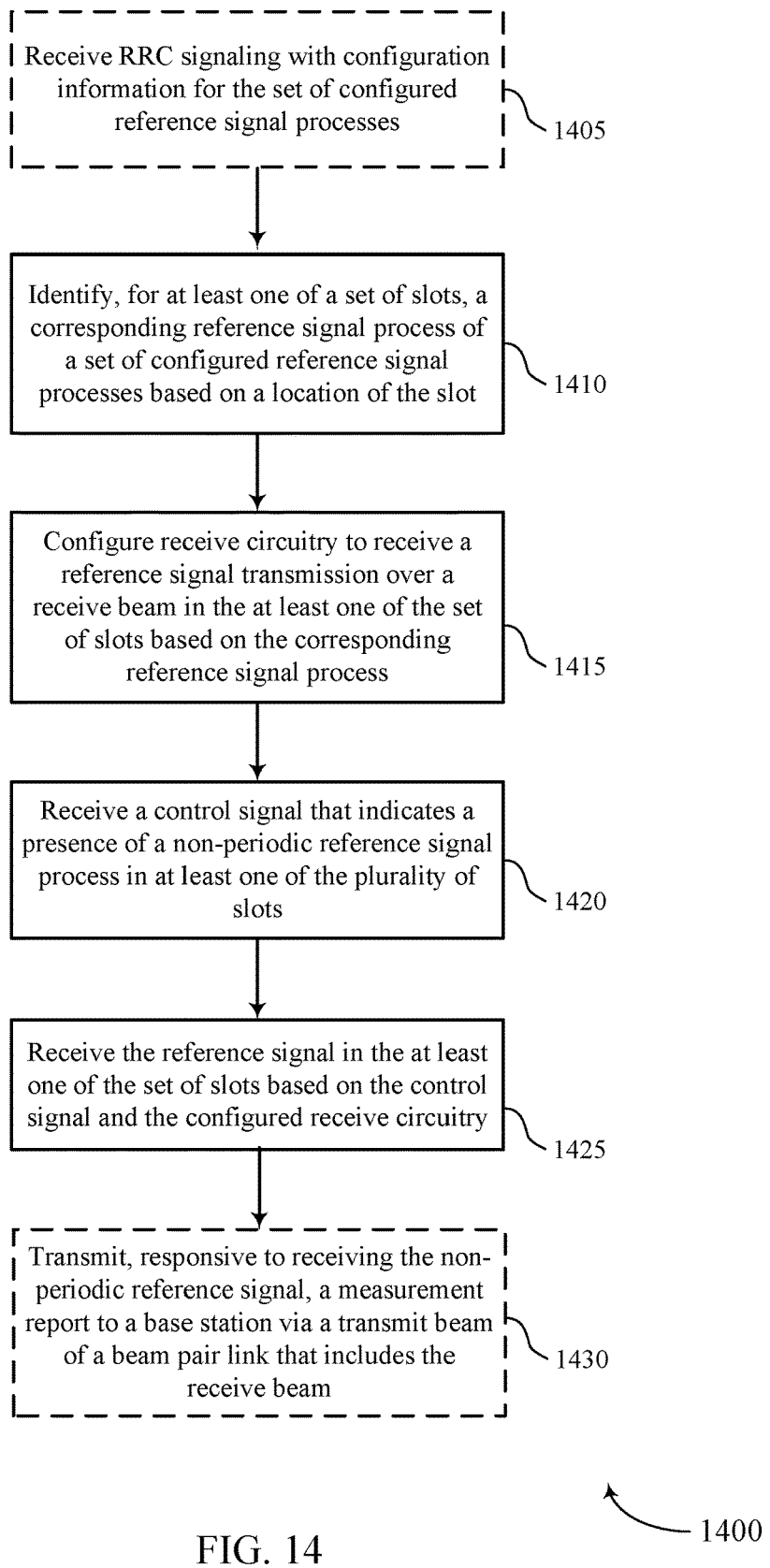
FIGS. 14 through 15 illustrate methods for reference signal resource location techniques in wireless communications in accordance with aspects of the present disclosure.

FIG. 14 shows a flowchart illustrating a method 1400 for reference signal resource location techniques in wireless communications in accordance with aspects of the present disclosure. The operations of method 1400 may be implemented by a UE 115 or its components as described herein. For example, the operations of method 1400 may be performed by a UE reference signal manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At optional block 1405 the UE 115 may receive radio resource control (RRC) signaling with configuration information for the plurality of configured reference signal processes. The operations of block 1405 may be performed according to the methods described herein. In certain examples, aspects of the operations of block 1405 may be performed by a reference signal process manager as described with reference to FIGS. 6 through 9. In some cases, the RRC signaling may provide a set of available reference signal processes that may be used for reference signal monitoring and related reporting at the UE.

At block 1410 the UE 115 may identify, for at least one of a plurality of slots, a corresponding reference signal process of a plurality of configured reference signal processes based at least in part on a location of the slot. The operations of block 1410 may be performed according to the methods described herein. In certain examples, aspects of the operations of block 1410 may be performed by a reference signal process manager as described with reference to FIGS. 6 through 9. Such identification may include identifying time resources, frequency resources, or combinations thereof, which may be identified separately for different slots within a radio frame, based on the number of reference signal processes and a location of the particular slot within the radio frame. In some cases, a reference signal process number may be equal to the slot number within a radio frame modulo N, where N is larger than the number of provisioned reference signal processes (e.g., N may be 4 or 8). This allows the UE to prepare the RF hardware for the appropriate sequence of receive-beams ahead of time, while also providing a base station with flexibility for scheduling non-periodic reference signals within slots.

At block 1415 the UE 115 may configure receive circuitry to receive a reference signal transmission over a receive beam in the at least one of the plurality of slots based at least in part on the corresponding reference signal process. The operations of block 1415 may be performed according to the methods described herein. In certain examples, aspects of the operations of block 1415 may be performed by a receive beamforming controller as described with reference to FIGS. 6 through 9. The configuration of the receive circuitry may include configuring various analog RF components according to the receive parameters that were computed. In some examples, a receive beamforming controller at UE may apply different antenna subarrays with different directivity patterns for different symbols, by adjusting LNAs and gain/phase adjust components to achieve the desired directionality in the receive beam.

At block 1420 the UE 115 may receive a control signal that indicates a presence of a non-periodic reference signal in at least one of the plurality of slots. The operations of block 1420 may be performed according to the methods described herein. In certain examples, aspects of the operations of block 1420 may be performed by a control signal identification component as described with reference to FIGS. 6 through 9. Such an indication may indicate the presence or absence of a reference signal in the slot, and the reference process may be determined based on the configured reference signal processes (e.g., based on a slot number of the slot). Such an indication may allow the base station to schedule non-periodic reference signal transmissions.

At block 1425 the UE 115 may receive the reference signal in the at least one of the plurality of slots based at least in part on the control signal and the configured receive circuitry. The operations of block 1425 may be performed according to the methods described herein. In certain examples, aspects of the operations of block 1425 may be performed by a receive beam manager as described with reference to FIGS. 6 through 9. The UE, as part of receiving the reference signal may perform reference signal processing such as channel state measurements, which may include energy measurements for a reference signal, interference and noise measurements, or any combination thereof.

At optional block 1430 the UE 115 may transmit, responsive to receiving the non-periodic reference signal, a measurement report to a base station via a transmit beam of a beam pair link that includes the receive beam. The operations of block 1430 may be performed according to the methods described herein. In certain examples, aspects of the operations of block 1430 may be performed by a reference signal process manager as described with reference to FIGS. 6 through 9. The UE, as part of transmitting the measurement report, may transmit measurements from reference signal processing such as channel state measurements, which may include energy measurements for a reference signal, interference and noise measurements, or any combination thereof. The transmit beam may use the resources that were configured for the slot and may be transmitted according to the beamforming parameters associated with the reference signal process.

Figure 15:
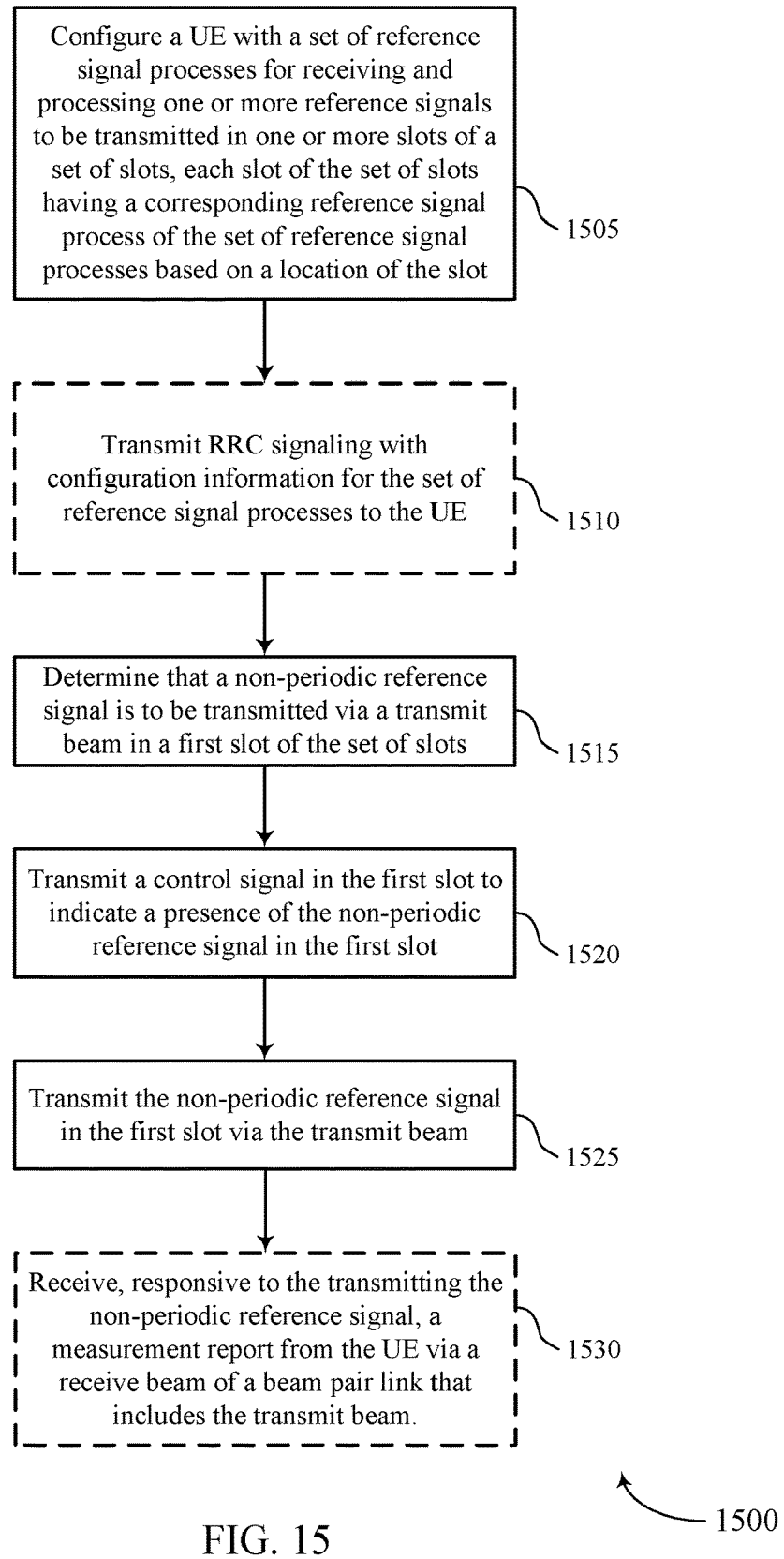

FIG. 15 shows a flowchart illustrating a method 1500 for reference signal resource location techniques in wireless communications in accordance with aspects of the present disclosure. The operations of method 1500 may be implemented by a base station 105 or its components as described herein. For example, the operations of method 1500 may be performed by a base station reference signal manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may configure a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot. The operations of block 1505 may be performed according to the methods described herein. In certain examples, aspects of the operations of block 1505 may be performed by a reference signal process manager as described with reference to FIGS. 10 through 13. In some cases, the reference signal processes may include identification of time resources, frequency resources, or combinations thereof, which may be identified separately for different slots within a radio frame, based on the number of reference signal processes and a location of the particular slot within the radio frame. In some cases, a reference signal process number may be equal to the slot number within a radio frame modulo N, where N is larger than the number of provisioned reference signal processes (e.g., N may be 4 or 8).

At block 1510 the base station 105 may transmit radio resource control (RRC) signaling with configuration information for the plurality of reference signal processes to the UE. The operations of block 1510 may be performed according to the methods described herein. In certain examples, aspects of the operations of block 1510 may be performed by a reference signal process manager as described with reference to FIGS. 10 through 13. In some cases, the RRC signaling may provide a set of available reference signal processes that may be used for reference signal monitoring and related reporting at the UE. This allows the UE to prepare the RF hardware for the appropriate sequence of receive-beams ahead of time, while also providing a base station with flexibility for scheduling non-periodic reference signals within slots.

At block 1515 the base station 105 may determine that a reference signal is to be transmitted via a transmit beam in a first slot of the plurality of slots. The operations of block 1515 may be performed according to the methods described herein. In certain examples, aspects of the operations of block 1515 may be performed by a resource allocation component as described with reference to FIGS. 10 through 13. In some cases, the base station 105 may determine slots for reference signal processes based on various factors, such as channel quality aspects, timing since prior reference signal processes, or one or more other factors. Such determination at the base station 105-b may allow the base station to schedule non-periodic reference signal transmissions, as periodic reference signal transmissions would be preconfigured and transmitted without an indication of the presence of absence of a reference signal transmission.

At block 1520 the base station 105 may transmit a control signal in the first slot to indicate a presence of the reference signal in the first slot. The operations of block 1520 may be performed according to the methods described herein. In certain examples, aspects of the operations of block 1520 may be performed by a control signal identification component as described with reference to FIGS. 10 through 13. In some cases, the control signal may be a flag in DCI to indicate the presence or absence of a reference signal transmission in the slot.

At block 1525 the base station 105 may transmit the reference signal in the first slot. The operations of block 1525 may be performed according to the methods described herein. In certain examples, aspects of the operations of block 1525 may be performed by a transmission beam manager as described with reference to FIGS. 10 through 13. Such a reference signal transmission may use the resources that were configured for the slot and may be transmitted according to the beamforming parameters associated with the reference signal process.

At optional block 1530 the base station 105 may receive, responsive to the transmitting the non-periodic reference signal, a measurement report from the UE via a receive beam of a beam pair link that includes the transmit beam. The operations of block 1530 may be performed according to the methods described herein. In certain examples, aspects of the operations of block 1530 may be performed by a transmission beam manager as described with reference to FIGS. 10 through 13. Such a measurement report via the receive beam may use the resources that were configured for the slot and may be transmitted according to the beamforming parameters associated with the reference signal process.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying, for at least one of a plurality of slots, a corresponding reference signal process of a plurality of configured reference signal processes based at least in part on a location of the slot, wherein the corresponding reference signal process indicates one or more beamforming parameters for a receive beam;
   receiving a control signal that indicates a presence of a non-periodic reference signal in at least one of the plurality of slots; and
   receiving the non-periodic reference signal in the at least one of the plurality of slots based at least in part on the control signal and the beamforming parameters.

2. The method of claim 1, wherein the corresponding reference signal process of the plurality of configured reference signal processes is further identified based at least in part on and a number of the plurality of configured reference signal processes.

3. The method of claim 1, further comprising:
   transmitting, responsive to the receiving the non-periodic reference signal, a measurement report to a base station via a transmit beam of a beam pair link that includes the receive beam.

4. The method of claim 1, wherein:
   each of the plurality of configured reference signal processes includes one or more of time resources or frequency resources configured for an associated reference signal transmission.

5. The method of claim 4, wherein:
   the corresponding reference signal process of the plurality of configured reference signal processes is identified based at least in part on a slot index of the at least one of the plurality of slots.

6. The method of claim 4, wherein:
   the corresponding reference signal process of the plurality of configured reference signal processes is identified as a slot index modulo a number of the plurality of configured reference signal processes.

7. The method of claim 1, wherein:
   the control signal comprises an indication in downlink control information (DCI) within the at least one of the plurality of slots.

8. The method of claim 1, further comprising:
   receiving radio resource control (RRC) signaling with configuration information for the plurality of configured reference signal processes.

9. A method for wireless communication, comprising:
   configuring a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot;
   transmitting a control signal to indicate a presence of a non-periodic reference signal in a first slot of the plurality of slots; and
   transmitting the non-periodic reference signal in the first slot via a transmit beam of a plurality of transmit beams.

10. The method of claim 9, wherein the corresponding reference signal process of the plurality of configured reference signal processes is further based at least in part on a number of the plurality of configured reference signal processes.

11. The method of claim 9, further comprising:
    receiving, responsive to the transmitting the non-periodic reference signal, a measurement report from the UE via a receive beam of a beam pair link that includes the transmit beam.

12. The method of claim 9, wherein:
    each of the plurality of reference signal processes includes one or more of time resources or frequency resources configured for an associated reference signal transmission.

13. The method of claim 12, wherein:
    the corresponding reference signal process of the plurality of configured reference signal processes is identified based at least in part on a slot index.

14. The method of claim 12, wherein:
    the corresponding reference signal process of the plurality of configured reference signal processes is identified as a slot index modulo a number of the plurality of configured reference signal processes.

15. The method of claim 9, wherein:
the transmitting the control signal comprises setting an indicator in downlink control information (DCI) of the first slot to indicate the presence or absence of the reference signal in the first slot.

16. The method of claim 9, wherein:
the configuring comprises transmitting radio resource control (RRC) signaling with configuration information for the plurality of reference signal processes to the UE.

17. An apparatus for wireless communication, comprising:
means for identifying, for at least one of a plurality of slots, a corresponding reference signal process of a plurality of configured reference signal processes based at least in part on a location of the slot, wherein the corresponding reference signal process indicates one or more beamforming parameters for a receive beam;
means for receiving a control signal that indicates a presence of a non-periodic reference signal in at least one of the plurality of slots; and
means for receiving the non-periodic reference signal in the at least one of the plurality of slots based at least in part on the control signal and the beamforming parameters.

18. The apparatus of claim 17, wherein:
each of the plurality of configured reference signal processes includes one or more of time resources or frequency resources configured for an associated reference signal transmission.

19. The apparatus of claim 18, wherein:
the corresponding reference signal process of the plurality of configured reference signal processes is identified based at least in part on a slot index of the at least one of the plurality of slots.

20. The apparatus of claim 18, wherein:
the corresponding reference signal process of the plurality of configured reference signal processes is identified as a slot index modulo a number of the plurality of configured reference signal processes.

21. The apparatus of claim 17, wherein:
the control signal comprises an indication in downlink control information (DCI) within the at least one of the plurality of slots.

22. The apparatus of claim 17, further comprising:
means for receiving radio resource control (RRC) signaling with configuration information for the plurality of configured reference signal processes.

23. An apparatus for wireless communication, comprising:
means for configuring a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot;
means for transmitting a control signal to indicate a presence of a non-periodic reference signal in a first slot of the plurality of slots; and
means for transmitting the non-periodic reference signal in the first slot via a transmit beam of a plurality of transmit beams.

24. The apparatus of claim 23, wherein:
each of the plurality of reference signal processes includes one or more of time resources or frequency resources configured for an associated reference signal transmission.

25. The apparatus of claim 24, wherein:
the corresponding reference signal process of the plurality of configured reference signal processes is identified based at least in part on a slot index.

26. The apparatus of claim 24, wherein:
the corresponding reference signal process of the plurality of configured reference signal processes is identified as a slot index modulo a number of the plurality of configured reference signal processes.

27. The apparatus of claim 23, wherein:
the means for transmitting the control signal sets an indicator in downlink control information (DCI) of the first slot to indicate the presence or absence of the reference signal in the first slot.

28. The apparatus of claim 23, wherein:
the means for configuring transmits radio resource control (RRC) signaling with configuration information for the plurality of reference signal processes to the UE.

29. An apparatus for wireless communication, comprising:
a processor;
memory in electronic communication with the processor; and
instructions stored in the memory and operable, when executed by the processor, to cause the apparatus to:
identify, for at least one of a plurality of slots, a corresponding reference signal process of a plurality of configured reference signal processes based at least in part on a location of the slot, wherein the corresponding reference signal process indicates one or more beamforming parameters for a receive beam;
receive a control signal that indicates a presence of a non-periodic reference signal in at least one of the plurality of slots; and
receive the non-periodic reference signal in the at least one of the plurality of slots based at least in part on the control signal and the beamforming parameters.

30. The apparatus of claim 29, wherein:
each of the plurality of configured reference signal processes includes one or more of time resources or frequency resources configured for an associated reference signal transmission.

31. The apparatus of claim 30 wherein:
the corresponding reference signal process of the plurality of configured reference signal processes is identified based at least in part on a slot index of the at least one of the plurality of slots.

32. The apparatus of claim 30, wherein:
the corresponding reference signal process of the plurality of configured reference signal processes is identified as a slot index modulo a number of the plurality of configured reference signal processes.

33. The apparatus of claim 29, wherein:
the control signal comprises an indication in downlink control information (DCI) within the at least one of the plurality of slots.

34. The apparatus of claim 29, wherein the instructions further cause the apparatus to:
receive radio resource control (RRC) signaling with configuration information for the plurality of configured reference signal processes.

35. An apparatus for wireless communication, comprising:
- a processor;
- memory in electronic communication with the processor; and
- instructions stored in the memory and operable, when executed by the processor, to cause the apparatus to:
- configure a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot;
- transmit a control signal to indicate a presence of a non-periodic reference signal in a first slot of the plurality of slots; and
- transmit the non-periodic reference signal in the first slot via a transmit beam of a plurality of transmit beams.

36. The apparatus of claim 35, wherein:
each of the plurality of reference signal processes includes one or more of time resources or frequency resources configured for an associated reference signal transmission.

37. The apparatus of claim 36, wherein:
the corresponding reference signal process of the plurality of configured reference signal processes is identified based at least in part on a slot index.

38. The apparatus of claim 36, wherein:
the corresponding reference signal process of the plurality of configured reference signal processes is identified as a slot index modulo a number of the plurality of configured reference signal processes.

39. The apparatus of claim 35, wherein:
the means for transmitting the control signal sets an indicator in downlink control information (DCI) of the first slot to indicate the presence or absence of the reference signal in the first slot.

40. The apparatus of claim 35, wherein:
the means for configuring transmits radio resource control (RRC) signaling with configuration information for the plurality of reference signal processes to the UE.

41. A non-transitory computer readable medium storing code for wireless communication, the code comprising instructions executable by a processor to:
- identify, for at least one of a plurality of slots, a corresponding reference signal process of a plurality of configured reference signal processes based at least in part on a location of the slot, wherein the corresponding reference signal process indicates one or more beamforming parameters for a receive beam;
- receive a control signal that indicates a presence of a non-periodic reference signal in at least one of the plurality of slots; and
- receive the non-periodic reference signal in the at least one of the plurality of slots based at least in part on the control signal and the beamforming parameters.

42. A non-transitory computer readable medium storing code for wireless communication, the code comprising instructions executable by a processor to:
- configure a user equipment (UE) with a plurality of reference signal processes for receiving and processing one or more reference signals to be transmitted in one or more slots of a plurality of slots, each slot of the plurality of slots having a corresponding reference signal process of the plurality of reference signal processes based at least in part on a location of the slot;
- transmit a control signal to indicate a presence of a non-periodic reference signal in a first slot of the plurality of slots; and
- transmit the non-periodic reference signal in the first slot via a transmit beam of a plurality of transmit beams.

* * * * *